United States Patent
Inui et al.

(10) Patent No.: US 11,330,831 B2
(45) Date of Patent: May 17, 2022

(54) BEER-TASTE BEVERAGE

(71) Applicant: Suntory Holdings Limited, Osaka (JP)

(72) Inventors: Takako Inui, Ibaraki (JP); Anna Shimmura, Kokubunji (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 627 days.

(21) Appl. No.: 16/339,096

(22) PCT Filed: Oct. 7, 2016

(86) PCT No.: PCT/JP2016/079995
§ 371 (c)(1),
(2) Date: Apr. 3, 2019

(87) PCT Pub. No.: WO2018/066132
PCT Pub. Date: Apr. 12, 2018

(65) Prior Publication Data
US 2019/0223471 A1    Jul. 25, 2019

(51) Int. Cl.
*A23L 2/38* (2021.01)
*A23L 2/56* (2006.01)
(Continued)

(52) U.S. Cl.
CPC ............. *A23L 2/382* (2013.01); *A23L 2/00* (2013.01); *A23L 2/38* (2013.01); *A23L 2/56* (2013.01);
(Continued)

(58) Field of Classification Search
CPC ... A23L 2/382; A23L 2/00; A23L 2/56; A23L 2/38; C12G 3/07; C12C 12/04; C12C 3/085; C12C 7/205; C12C 11/11
See application file for complete search history.

(56) References Cited

U.S. PATENT DOCUMENTS

2003/0072845 A1   4/2003  Shimizu et al.
2006/0257526 A1   11/2006 Shimizu et al.
(Continued)

FOREIGN PATENT DOCUMENTS

JP    7-236467 A    9/1995
JP    2015-27309 A  2/2015
(Continued)

OTHER PUBLICATIONS

Onda, T. et al., "Technical Development of Prevention of Contamination with Phenolic Off-Flavors Producing Yeast in Red Wines", Report of the Yamanashi Industrial Technology Center, 2012, No. 26, pp. 89-92; cited in ISR.
(Continued)

*Primary Examiner* — Vera Stulii
(74) *Attorney, Agent, or Firm* — WHDA, LLP

(57) ABSTRACT

A beer-taste beverage containing (A) γ-octanolactone, (B) 5-hydroxymethylfurfural (5-HMF), (C) trans-oaklactone, and (D) 4-ethylguaiacol, wherein the components satisfy the following (1) and (2): (1) a concentration ratio of the component A to the component B, A/B (ppb/ppb), is 0.009 or more; and (2) a concentration ratio of the component C to the component D, C/D (ppb/ppb), is 0.1 or more. In the beer-taste beverage of the present invention, rich sweetness and a smoky feel are given in an excellent balance, and off-flavors distinctively owned by the beer-taste beverages or a degradation odor generated with the change over time is masked (reduced), so that a new taste can be provided as a luxury product.

14 Claims, 1 Drawing Sheet

(51) Int. Cl.
  *C12C 3/08* (2006.01)
  *C12C 12/04* (2006.01)
  *C12G 3/07* (2006.01)
  *C12C 11/11* (2019.01)
  *A23L 2/00* (2006.01)

(52) U.S. Cl.
  CPC .............. *C12C 3/085* (2013.01); *C12C 11/11* (2013.01); *C12C 12/04* (2013.01); *C12G 3/07* (2019.02); *A23V 2002/00* (2013.01); *A23V 2200/15* (2013.01); *A23V 2300/04* (2013.01)

(56) References Cited

U.S. PATENT DOCUMENTS

2011/0113868 A1* 5/2011 Chatonnet ............... G01N 33/46 73/64.56
2015/0037459 A1* 2/2015 Chidambarakrishnan ................... B32B 27/16 426/11
2016/0017265 A1 1/2016 Chidambarakrishnan et al.
2019/0276188 A1* 9/2019 Kartika ................. B65D 85/72

FOREIGN PATENT DOCUMENTS

| | | |
|---|---|---|
| JP | 2015-47135 A | 3/2015 |
| JP | 2015-221019 A | 12/2015 |
| JP | 2016-13131 A | 1/2016 |
| JP | 2016-13132 A | 1/2016 |
| JP | 2016-526891 A | 9/2016 |
| WO | 02/04593 A1 | 1/2002 |

OTHER PUBLICATIONS

International Search Report dated Jan. 10, 2017, issued in counterpart International Application No. PCT/JP2016/079995. (2 pages).

* cited by examiner

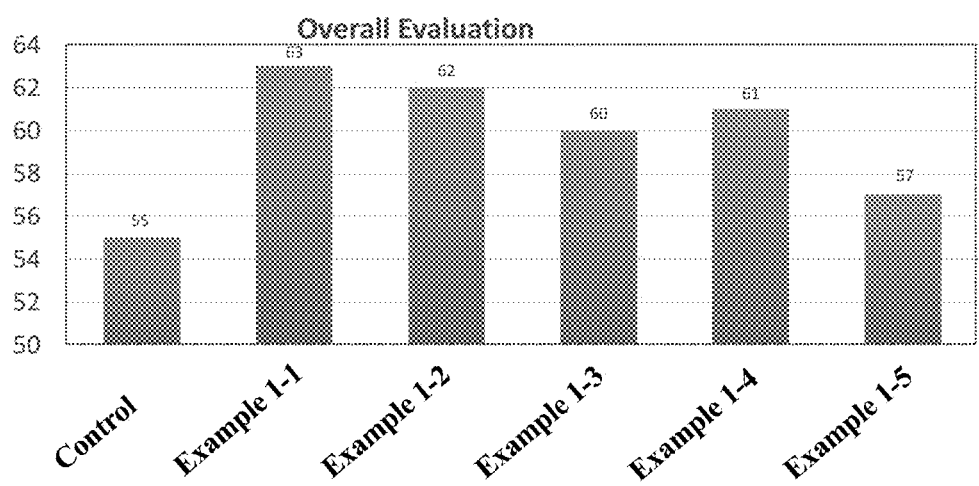

BEER-TASTE BEVERAGE

TECHNICAL FIELD

The present invention relates to a beer-taste beverage and a method for producing the same.

BACKGROUND ART

With the diversification of tastes of the consumers in the recent years, the development of beer-taste beverages having various flavor features is in demand.

For example, it has been reported that a beer-taste beverage which has a feel of fruit-like aroma is provided by adding and blending separately aroma ingredients originally contained in the hops so as to have a given level (see, for example, Patent Publications 1 and 2). Also, Patent Publication 3 discloses that one or more masking materials selected from the group consisting of cyclodextrin and thaumatin are blended, to thereby give a non-fermented beer-taste beverage having a very small remaining astringent taste and good after taste, even if a total content of the polyphenols derived from malts and hops is high.

On the other hand, as a method for adjusting a flavor using conventional raw materials without using an additive, a masking agent, or the like, a technique of flavoring as a flavor originally from hop ingredients by using hops which are previously freeze-dried after the harvest without drying as a raw material for a beer-taste beverage has been disclosed (see, for example, Patent Publication 4).

RELATED ART REFERENCES

Patent Publications

Patent Publication 1: Japanese Patent Laid-Open No. 2016-13131
Patent Publication 2: Japanese Patent Laid-Open No. 2016-13132
Patent Publication 3: Japanese Patent Laid-Open No. 2015-221019
Patent Publication 4: Japanese Patent Laid-Open No. 2015-47135

SUMMARY OF THE INVENTION

Problems to be Solved by the Invention

An object of the present invention is to provide a beer-taste beverage in which rich sweetness and a smoky feel are given in an excellent balance, and an off-flavor distinctly owned by the beer-taste beverage or a degraded odor generated with the change over time is masked (reduced), and a method for producing the same, and a flavoring agent that gives the above flavor.

Means to Solve the Problems

The present invention relates to the following [1] to [6]:
[1] A beer-taste beverage containing (A) γ-octanolactone, (B) 5-hydroxymethylfurfural (5-HMF), (C) trans-oaklactone, and (D) 4-ethylguaiacol, wherein the above components satisfy the following (1) and (2):
(1) a concentration ratio of the component A to the component B, A/B (ppb/ppb), is 0.009 or more; and
(2) a concentration ratio of the component C to the component D, C/D (ppb/ppb), is 0.1 or more.
[2] A flavoring agent containing (A) γ-octanolactone, (B) 5-hydroxymethylfurfural (5-HMF), (C) trans-oaklactone, and (D) 4-ethylguaiacol, wherein the above components satisfy the following (1) and (2):
(1) a concentration ratio of the component A to the component B, A/B (ppb/ppb), is 0.009 or more; and
(2) a concentration ratio of the component C to the component D, C/D (ppb/ppb), is 0.1 or more.
[3] A method for producing a beer-taste beverage as defined in the above [1], characterized in that the method comprises the steps of fermenting a wort, and aging a fermented wort in a wooden cask.
[4] A method for producing a beer-taste beverage as defined in the above [1], characterized in that the method comprises the steps of fermenting and aging a wort in a wooden cask.
[5] A method for producing a beer-taste beverage as defined in the above [1], characterized by the use of an aged solution obtained by fermenting a wort and aging a fermented wort in a wooden cask as one of the raw materials.
[6] A method for producing a beer-taste beverage as defined in the above [1], characterized by the use of an aged solution obtained by fermenting and aging a wort in a wooden cask as one of the raw materials.

Effects of the Invention

In the beer-taste beverage of the present invention, rich sweetness and a smoky feel are given in an excellent balance, and an off-flavor distinctly owned by the beer-taste beverage or a degraded odor generated with the change over time is masked (reduced), so that excellent effects are exhibited that a new flavor can be provided.

BRIEF DESCRIPTION OF THE DRAWINGS

FIG. 1 is a graph showing the sensory evaluation results (overall evaluations) of the beer-taste beverage produced in Test Example 1.

MODES FOR CARRYING OUT THE INVENTION

The term "beer-taste beverage" as used herein refers to a carbonated beverage having a beer-like flavor. In other words, the beer-taste beverage of the present specification embraces all the carbonated beverages having a beer flavor, irrespective of the presence or absence of a fermentation step with an yeast, unless specified otherwise. Specific examples thereof include beers, Happoushu (low-malt beers), other brewed liquors, liqueurs, non-alcoholic beverages and the like.

The beer-taste beverage of the present invention has some features that the beer-taste beverage contains (A) γ-octanolactone, (B) 5-hydroxymethylfurfural (5-HMF), (C) trans-oaklactone, and (D) 4-ethylguaiacol, and that these components are contained in specified concentration ratios. 5-HMF is an ingredient formed by a Maillard reaction induced by a reaction of an amino acid and sugar, which is an ingredient ordinarily contained in the beer-taste beverage. However, since this shows a distinctive odor, it is an ingredient having sensory disadvantages. In view of the above, as a result of intensive studies, the present inventors have remarked on two kinds of flavor ingredients showing coconut-like aroma, in other words, γ-octanolactone and trans-oaklactone, and 4-ethylguaiacol which shows a smoky feel of the varieties of flavor ingredients. The present inventors have surprisingly found that when the main ingredient analysis was performed on a total of four ingredients having different flavor characteristics, including 5-HMF showing a mildew odor, and when the above four ingredients satisfy specified relationships, in the beer-taste beverage obtained, rich sweetness and smoky feel are given in an excellent balance, and an off-flavor distinctly owned by the beer-taste beverage or a degraded odor generated with the change over time is masked. The ingredient contents thereof as used herein can be measured in accordance with the methods described in Examples set forth below.

[Component A]

γ-Octanolactone is an ingredient showing a coconut-like aroma, which is an ingredient attributable to rich sweetness. The content of γ-octanolactone in the beer-taste beverage of the present invention is preferably 4.0 ppb or more, more preferably 5.5 ppb or more, even more preferably 5.8 ppb or more, and even more preferably 6.0 ppb or more, from the viewpoint of giving rich sweetness, and the content is preferably 15.0 ppb or less, and more preferably 14.0 ppb or less, from the viewpoint of the balance in flavors. The expression "ppb" as used herein refers to "μg/kg."

[Component B]

Since the lower content of 5-HMF in the beer-taste beverage of the present invention, the better, the content is preferably 1,500 ppb or less, more preferably 1,300 ppb or less, and even more preferably 1,000 ppb or less, and the lower limit is 200 ppb or so.

[Component C]

trans-Oaklactone is an ingredient effective in also masking of 5-HMF, while being an ingredient showing a coconut-like aroma. The content of trans-oaklactone in the beer-taste beverage of the present invention is preferably 3.0 ppb or more, more preferably 5.0 ppb or more, and even more preferably 10.0 ppb or more, from the viewpoint of exhibiting masking effects, and the content is preferably 70.0 ppb or less, more preferably 50.0 ppb or less, and even more preferably 30.0 ppb or less, from the viewpoint of the balance in flavors.

[Component D]

4-Ethylguaiacol is an ingredient attributable to a smoky feel. The content of 4-ethylguaiacol in the beer-taste beverage of the present invention is preferably 0.1 ppb or more, more preferably 0.2 ppb or more, even more preferably 0.3 ppb or more, and even more preferably 0.5 ppb or more, from the viewpoint of giving a smoky feel, and the content is preferably 3.0 ppb or less, more preferably 2.0 ppb or less, and even more preferably 1.2 ppb or less, from the viewpoint of the balance in flavors.

In the present invention, when the above components satisfy specified concentration ratios, an off-flavor distinctively owned by the beer-taste beverage or a degraded odor is masked, whereby rich sweetness and a smoky feel are given in an excellent balance. Specifically, the beer-taste beverage of the present invention satisfies the relationship of a concentration ratio of a component A to a component B, A/B (ppb/ppb), of 0.009 or more, preferably 0.013 or more, and more preferably 0.017 or more, and the upper limit is preferably 0.06 or less, more preferably 0.04 or less, even more preferably 0.035 or less, and even more preferably 0.02 or less, and satisfies the relationship of a concentration ratio of a component C to a component D, C/D (ppb/ppb), of 0.1 or more, preferably 4.0 or more, and more preferably 6.0 or more, and the upper limit is preferably 50 or less, more preferably 30 or less, and even more preferably 20 or less.

A preferred embodiment includes, for example, an embodiment where a concentration ratio of a component A to a component B, A/B (ppb/ppb), is 0.013 or more, and a concentration ratio of a component C to a component D, C/D (ppb/ppb), is 4.0 or more; and an embodiment where a concentration ratio of a component A to a component B, A/B (ppb/ppb), is 0.017 or more, and a concentration ratio of a component C to a component D, C/D (ppb/ppb), is 6.0 or more.

The method for allowing the above components to satisfy specified concentration ratios is not particularly limited, and the concentration ratios can be adjusted by properly using flavors of various ingredients. In addition, the concentration ratios can be satisfied by adjusting the brewing conditions or selection of raw materials. Specifically, for example, of the production steps of raw material liquor (also called raw liquor) for an intended beer-taste beverage, the components A and D can be adjusted by selecting the kinds of yeasts used in fermentation, and the component B can be adjusted by boiling strength of a wort. The component C can be adjusted by contacting with various wood articles after the fermentation step during the production of a raw liquor, for example, aging in a wooden cask having different materials, shapes, strength of char, and the like, or adding a processed product of a wood article and storing. In addition, the components A, B, C, and D can also be adjusted by such means of selecting a cask having a different history of wooden cask (for example, period used in aging whisky or the like) during the above aging, modifying sizes or amounts of wooden processed products such as wood chips, or changing kinds of wooden casks. As one embodiment of the present invention, a method including aging and adjusting the concentration ratios of each of the components will be explained hereinbelow.

Specifically, for example, the method includes a method including adding an yeast to a clear wort obtained by a known method to allow fermentation, charging a wooden cask with a fermented wort directly without removing solid contents such as yeast debris, and aging.

As the wooden cask used, a known cask made of wood can be used without limitations. Although the materials are not particularly limited, for example, a plant belonging to the genus *Quercus* sp of Fagaceae can be suitably used, from the viewpoint of masking effects. Specific examples include, for example, *Quercus serrata* (nara, a group of plants belonging to *Quercus* that are deciduous and broad-leaves), *Quercus mongolia* (*Quercus mongolia* var. *grosseserrata*), *Quercus dentata, Quercus acutissima, Quercus myrsinaefolia*, white oak, *Quercus robur* (common oak) (also called limousine oak, French oak), and Spanish oak. These may be used alone or in a combination of two or more kinds. Also, the used history of the wooden cask is not particularly limited, and one that is immediately after the production may be used, or one which is previously used as an aging cask for whisky, wine, or brandy may be reused. In addition, a heat treatment such as baking an inner side before use may be carried out. The volume capacity is not particularly limited, and includes, for example, from 1 L to 3,000 L or so.

The filling ratio of the wort to the wooden cask mentioned above is not particularly limited, and it is preferable that it is filled up to a volume capacity of the cask, from the viewpoint of inhibiting oxidation by the air.

The aging temperature is preferably 0° C. or higher, more preferably 10° C. or higher, and even more preferably 15° C. or higher, from the viewpoint of obtaining masking effects, and the aging temperature is preferably 30° C. or lower, more preferably 25° C. or lower, and even more preferably 20° C. or lower, from the viewpoint of obtaining the balance in flavors. Here, the aging temperature as used herein refers to a temperature in a chamber in which a wort is stored, which can be measured with a chamber thermometer.

The aging period is preferably one week at shortest, and more preferably two weeks or more, from the viewpoint of obtaining sufficient masking effects. On the other hand, the upper limit is preferably five weeks or less, more preferably four weeks or less, and even more preferably three weeks or less, from the viewpoint of obtaining the balance in flavors. Therefore, the aging period is preferably from one to five weeks, more preferably from two to four weeks, and even more preferably from two to three weeks.

Alternatively, another embodiment of the present invention includes a method including filling a clear wort obtained by a known method to a wooden cask, and carrying out fermentation and aging. Here, the fermentation is carried out under ordinary conditions, and the aging can be carried out in the same manner as the embodiment mentioned above.

By selecting a brewing method as mentioned above, in a wort obtained, an off-flavor distinctively owned by the beer-taste beverage is masked, thereby giving rich sweetness and a smoky feel in an excellent balance. In addition, even when stored, the generation of degraded order is inhibited. Here, instead of filling to a wooden cask and aging, processed products such as chips or wood powders obtained from the same wood as the wooden cask can also be added to a wort, and allowed to age with optional heating and boiling. Alternatively, the above processed products are added to a wort, the mixture is heated to boil, the heated mixture is filled in a vessel made of stainless steel or the like to allow fermentation, and fermented mixture is filled in a wooden cask in the same manner as above and allowed to age. Here, the added proportion of the processed products to the wort is not unconditionally determined, and can be properly adjusted depending upon the kinds and forms of the processed products.

The beer-taste beverage of the present invention can contain, besides the above components, other known components within the range that would not impair the effects of the present invention. The contents of the other components can be properly set in accordance with known techniques.

The method for producing a beer-taste beverage of the present invention can be carried out in accordance with an ordinary method known to one of ordinary skill in the art except for carrying out the step of adjusting so that the four components mentioned above fulfill the specified concentration ratios. For example, raw materials containing at least one member selected from the group consisting of wheat such as malts, other grains, starches, and sugars, and optionally a bittering agent, a colorant, or the like are supplied to a mash kettle or mash tun, and optionally an enzyme such as amylase is added thereto to carry out gelatinization or saccharification, and then filtered to remove husks or the like, to give a wort. Next, to a wort obtained, the hop processed product of the present invention, optionally together with known hops (or a hop processed product), is added to boil, and solid contents such as coagulated proteins are removed in a clearing tank, to give a clear wort. As to the conditions for these saccharification step, the boiling and clearing step, the solid content removal step, and the like, known conditions may be used.

Next, an alcoholic beverage can be produced by adding an yeast to a clear wort obtained above to allow fermentation, and then adjusting concentration ratios of the four components mentioned above, and thereafter optionally removing the yeast with a filtration apparatus or the like (also referred to as a fermentation step). As the fermentation conditions, known conditions may be used. In addition, the hops may be added after the beginning of the fermentation. Alternatively, raw materials having alcohol contents such as Spirits may be added instead of going through the fermentation step, and then the concentration ratios of the four components mentioned above may be adjusted. Further, the process can go through the steps of storage (stored liquor), with optional addition of a carbon dioxide gas, filtration and bottling, and optionally sterilization, whereby an alcoholic beer-taste beverage can be obtained.

On the other hand, in a case of a nonalcoholic beverage, the nonalcoholic beverage can be produced by, for example, subsequent to the above solid content-removing step, adjusting concentration ratios of the four components in a clear wort obtained, storing the clear wort as it is, adding a carbon dioxide gas thereto, and subjecting to steps of filtration and bottling, and optionally sterilization, without going through the above fermentation step. Alternatively, a nonalcoholic beer-taste beverage can also be obtained by, subsequent to the above fermentation step of the alcoholic beverage, reducing an alcoholic concentration according to a known method such as beer film treatment or dilution.

Here, the step of adjusting concentration ratios of the four components as used herein can be carried out by referring to the section of the beer-taste beverage of the present invention. Specifically, one example includes the steps of adding a yeast to a wort to allow fermentation, and aging a fermented mixture in a wooden cask for preferably one to five weeks, preferably for two to four weeks, and even more preferably two to three weeks. In addition, another embodiment includes the step of carrying out fermentation and aging in a vessel such as a wooden cask. Also, a flavoring agent of the present invention mentioned later can be properly added and carried out.

Thus, a beer-taste beverage of the present invention can be made.

Since the present invention also makes it possible to give a beer-taste beverage with rich sweetness and a smoky feel in an excellent balance, and to mask off-flavor or degraded odor by adjusting the concentration ratios of the four components mentioned above, a flavoring agent satisfying a specified relationship in the concentration ratios of the four components mentioned above is provided. In other words, the flavoring agent of the present invention contains (A) γ-octanolactone, (B) 5-hydroxymethylfurfural (5-HMF), (C) trans-oaklactone, and (D) 4-ethylguaiacol, and the above components satisfy the following (1) and (2):
(1) a concentration ratio of the component A to the component B, A/B (ppb/ppb), is 0.009 or more; and
(2) a concentration ratio of the component C to the component D, C/D (ppb/ppb), is 0.1 or more.

Specifically, the concentration ratios of the above components in the flavoring agent of the present invention are such that the concentration ratio of the component A to the component B, A/B (ppb/ppb), is 0.009 or more, preferably 0.013 or more, and more preferably 0.017 or more, and the upper limit is preferably 0.06 or less, more preferably 0.04 or less, even more preferably 0.035 or less, and even more preferably 0.03 or less, and that the concentration ratio of the component C to the component D, C/D (ppb/ppb), is 0.1 or more, preferably 4.0 or more, and more preferably 6.0 or more, and the upper limit is preferably 50 or less, more preferably 30 or less, and even more preferably 20 or less.

In addition, the contents of the above components in the flavoring agent of the present invention are not particularly limited, so long as the concentration ratios satisfy the above relationships, and examples include, for example, the contents in the beer-taste beverage of the present invention. Accordingly, one embodiment of the flavoring agent of the present invention includes an aged liquid obtained by adding a yeast to a wort to allow fermentation, and aging a fermented mixture in a wooden cask for preferably one to five weeks, more preferably for two to four weeks, and even more preferably two to three weeks.

The flavoring agent of the present invention can be produced in accordance with a known method according to its shape, so long as the concentration ratios of the above components fall within the ranges defined above. For example, the flavoring agent can be produced as an intermediary solution during the manufacture of a beer-taste beverage. In addition, the flavoring agent can be produced by adding separately a flavor ingredient mentioned above. These may be optionally subjected to filtration, concentration, dilution or the like.

By using a flavoring agent mentioned above, a desired beer-taste beverage can be produced in high precision by using an aged solution obtained by fermenting a wort, and aging a fermented mixture in a wooden cask for preferably from one to five weeks, for more preferably from two to four weeks, and for even more preferably from two to three weeks, as one of the raw materials.

EXAMPLES

The present invention will be specifically described hereinbelow by illustrating Examples, without intending to limit the scope of the present invention to the following Examples.

[Contents of Flavor Ingredients]

The contents of the flavor ingredients are obtained by using a gas chromatography mass spectrometer (GC-MS) described in *J. Agric. Food Chem.* 2009, 57, 6383-6391 (Volatile Compounds of Red Wines Macerated with Spanish, American, and French Oak Chips.).

Test Example 1

[Production]

A wort was produced according to a conventional method using raw materials of 100% by weight malts. Specifically, powdered products of malts and ungerminated barley were saccharified, and a saccharified liquid obtained was filtered. To a filtrate obtained were added hops, and a mixture was boiled, to give a wort having an extract component of 17.0% by weight. Next, an ale yeast was added thereto to allow fermentation according to a conventional method, and a fermented mixture was aged in a wooden cask A made of French oak and a wooden cask B made of white oak, in a chamber at a temperature of 15° C. under conditions shown in Table 1, a filling ratio being 100% by volume when filled into a cask. Thereafter, a carbon dioxide gas was added in a proper amount, and a carbonated aged mixture went through the steps of filtration, bottling in a vessel, and sterilization (heating at 65° C. or higher for 10 minutes), to give a beer-taste beverage. Here, a beer-taste beverage in which aging in a wooden cask was not carried out was used as a control.

[Evaluations]

Flavors of the beer-taste beverages obtained were evaluated by sensory test according to a scoring method. Five well trained sensory evaluators (panelists) were asked to score in six sensory descriptors, i.e., "full-bodied," "coconut-like," "vanilla-like," "woody," "smoky," and "oxidized malty," ranging from scores zero (0) to three (3), i.e., not felt to very strongly felt, in increments of 0.1. In addition, as "the overall evaluation," the scoring was made ranging from three (3) to seven (7), i.e., poor to excellent, in increments of 0.1. Here, as to "oxidized malty," a sample stored at 28° C. for three weeks was evaluated, and as to others, those immediately after the production were evaluated. Each of the scores obtained was standardized so that a mean score of all the sample would be 50 and a standard deviation would be 10 for individual panelists, a mean score of the evaluation scores of all the panelists was calculated, and the evaluation was made according to a mean score in accordance with the following criteria. As to the "overall evaluation," the higher the mean score, the better, and it was judged that a mean score is preferably 58 or more, and more preferably 60 or more. As to "full-bodied," it was judged that a mean score is preferably 40 or more and 60 or less, and more preferably a mean score of 45 or more and 55 or less. As to "coconut-like," it was judged that a mean score is preferably 43 or more and 65 or less, and more preferably a mean score of 45 or more and 55 or less. As to "vanilla-like," it was judged that a mean score is preferably 40 or more and 65 or less, and more preferably a mean score of 50 or more and 57 or less. As to "woody," it was judged that a mean score is preferably 35 or more and 55 or less, and more preferably a mean score of 40 or more and 50 or less. As to "smoky," it was judged that a mean score is preferably 40 or more and 55 or less, and more preferably a mean score of 42 or more and 52 or less. As to "oxidized malty," it was judged that a mean score is preferably 55 or less, and more preferably 52 or less. All the evaluation results are shown in Table 1, and the results comparing the overall evaluations are shown in FIG. 1.

Test Example 2

[Production]

Wort was produced in accordance with a conventional method using raw materials having a composition of 24% by weight of malts, 10% by weight of ungerminated barleys, and 66% by weight of a sugar liquid. Specifically, powdered products of malts and ungerminated barleys were saccharified, and a saccharified liquid obtained was filtered. To a filtrate obtained were added hops and a sugar liquid, and the mixture was boiled, to give a wort containing 17.0% by weight of an extract component. Next, a lager yeast was added thereto to allow fermentation according to a conventional method, and a fermented mixture was aged with a wooden cask C made of French oak in a chamber at a temperature of 15° C. under conditions shown in Table 2, a filling ratio being 100% by volume when filled into a cask. Thereafter, a carbon dioxide gas was added in a proper amount, and a carbonated aged mixture went through the steps of filtration, bottling in a vessel, and sterilization (heating at 65° C. or higher for 10 minutes), to give a beer-taste beverage. Here, a beer-taste beverage in which aging in a wooden cask was not carried out was used as a control.

The flavors of the beer-taste beverages obtained were evaluated in the same manner as in Test Example 1. The results are shown in Table 2.

TABLE 1

|  |  | Control | Examples | | | | |
|---|---|---|---|---|---|---|---|
|  |  |  | 1-1 | 1-2 | 1-3 | 1-4 | 1-5 |
| Aging Conditions | Vessel | — | Wooden Cask A | Wooden Cask A | Wooden Cask A | Wooden Cask B | Wooden Cask B |
|  | Period (w) | — | 2 | 3 | 4 | 2 | 4 |
| Content of Flavor Ingredients, ppb | (A) γ-Octanolactone | 5.42 | 6.03 | 6.02 | 12.70 | 12.57 | 11.12 |
|  | (B) 5-HMF | 242.29 | 306.28 | 334.93 | 722.30 | 401.08 | 528.13 |
|  | (C) trans-Oaklactone | 0.00 | 16.76 | 25.19 | 14.18 | 5.10 | 9.06 |
|  | (D) 4-Ethylguaiacol | 1.08 | 1.04 | 1.03 | 0.58 | 0.39 | 0.55 |
| Concentration Ratio | A/B, ppb/ppb | 0.022 | 0.020 | 0.018 | 0.018 | 0.031 | 0.021 |
|  | C/D, ppb/ppb | 0.0 | 16.2 | 24.5 | 24.3 | 13.2 | 16.5 |
| Sensory Evaluation Immediately After Production | Overall Evaluations | 55 | 63 | 62 | 60 | 61 | 57 |
|  | Full-bodied | 43 | 47 | 50 | 51 | 54 | 55 |
|  | Coconut-like | 42 | 50 | 55 | 58 | 51 | 54 |
|  | Vanilla-like | 43 | 54 | 56 | 58 | 55 | 56 |
|  | Woody | 35 | 41 | 44 | 45 | 43 | 50 |
|  | Smoky | 40 | 43 | 47 | 49 | 48 | 52 |
| Sensory Evaluation After Storage | Oxidized malty | 58 | 48 | 45 | 43 | 49 | 46 |

TABLE 2

|  |  | Control | Example 2-1 |
|---|---|---|---|
| Aging Conditions | Vessel | — | Wooden Cask C |
|  | Period (w) | — | 2 |
| Content of Flavor Ingredients, ppb | (A) γ-Octanolactone | 8.80 | 7.52 |
|  | (B) 5-HMF | 278.90 | 306.66 |
|  | (C) trans-Oaklactone | 0 | 13.15 |
|  | (D) 4-Ethylguaiacol | 0.88 | 1.17 |
| Concentration Ratio | A/B, ppb/ppb | 0.032 | 0.025 |
|  | C/D, ppb/ppb | 0.00 | 11.29 |
| Sensory Evaluation Immediately After Production | Overall Evaluations | 54 | 60 |
|  | Full-bodied | 45 | 50 |
|  | Coconut-like | 42 | 50 |
|  | Vanilla-like | 40 | 54 |
|  | Woody | 33 | 49 |
|  | Smoky | 41 | 51 |
| Sensory Evaluation After Storage | Oxidized malty | 62 | 51 |

As is clear from Table 1, when the concentration ratios of the component A to the component B satisfy 0.009 or more and the concentration ratios of the component C to the component D satisfy 0.1 or more, it can be seen that rich sweetness and a smoky feel are in an excellent balance, so that the overall evaluation is excellent, and that the degraded odor distinctively owned by beer generated along with the change over time can be excellently masked. In addition, the same tendencies can be seen, even if the kinds of the casks were different.

Also, as is clear from Table 2, even when the original liquors to be aged are different, it can be seen that when the concentration ratios of the component A to the component B satisfy 0.009 or more and the concentration ratios of the component C to the component D satisfy 0.1 or more, rich sweetness and smoky feel are in a good balance, so that the overall evaluation is excellent, and that the degradation odor distinctively owned by beer generated along with the change over time can be excellently masked.

INDUSTRIAL APPLICABILITY

In the beer-taste beverage of the present invention, rich sweetness and a smoky feel are given in an excellent balance, and off-flavors distinctively owned by the beer-taste beverages or a degradation odor generated with the change over time is masked (reduced), so that a new taste can be provided as a luxury product.

The invention claimed is:

1. A beer-taste beverage comprising (A) γ-octanolactone, (B) 5-hydroxymethylfurfural (5-HMF), (C) trans-oaklactone, and (D) 4-ethylguaiacol, wherein the components satisfy the following (1) and (2):
   (1) a concentration ratio of the component A to the component B, A/B (ppb/ppb), is 0.009 or more; and
   (2) a concentration ratio of the component C to the component D, C/D (ppb/ppb), is 0.1 or more.

2. The beer-taste beverage according to claim 1, wherein the concentration ratio in (1) is 0.013 or more.

3. The beer-taste beverage according to claim 1, wherein the concentration ratio in (2) is 4.0 or more.

4. The beer-taste beverage according to claim 1, wherein the concentration ratio in (1) is 0.017 or more.

5. The beer-taste beverage according to claim 1, wherein the concentration ratio in (2) is 6.0 or more.

6. The beer-taste beverage according to claim 1, wherein the content of the component A is from 4.0 to 15.0 ppb.

7. The beer-taste beverage according to claim 1, wherein the content of the component C is from 3.0 to 70.0 ppb.

8. A flavoring agent comprising (A) γ-octanolactone, (B) 5-hydroxymethylfurfural (5-HMF), (C) trans-oaklactone, and (D) 4-ethylguaiacol, wherein the above components satisfy the following (1) and (2):
   (1) a concentration ratio of the component A to the component B, A/B (ppb/ppb), is 0.009 or more; and
   (2) a concentration ratio of the component C to the component D, C/D (ppb/ppb), is 0.1 or more.

9. A method for producing a beer-taste beverage as defined in claim 1, characterized in that the method comprises the steps of fermenting a wort, and aging a fermented wort in a wooden cask.

10. A method for producing a beer-taste beverage as defined in claim 1, characterized in that the method comprises the steps of fermenting and aging a wort in a wooden cask.

11. The method according to claim 9, wherein the aging period is one to five weeks.

12. A method for producing a beer-taste beverage as defined in claim 1, characterized by the use of an aged solution obtained by fermenting a wort and aging a fermented wort in a wooden cask as one of the raw materials.

13. A method for producing a beer-taste beverage as defined in claim 1, characterized by the use of an aged liquid obtained by fermenting and aging a wort in a wooden cask as one of the raw materials.

14. The method according to claim 12, wherein the aging period is one to five weeks.

* * * * *